US008015112B2

(12) United States Patent
Prakken et al.

(10) Patent No.: US 8,015,112 B2
(45) Date of Patent: Sep. 6, 2011

(54) EMBEDDED LICENSE DATA FILE DISTRIBUTION AND PROCESSING SYSTEM

(76) Inventors: Randy L. Prakken, Canby, OR (US); John Corrigan, Lake Oswego, OR (US); Glenn F. Widener, Portland, OR (US)

( * ) Notice: Subject to any disclaimer, the term of this patent is extended or adjusted under 35 U.S.C. 154(b) by 3160 days.

(21) Appl. No.: 09/754,927

(22) Filed: Jan. 4, 2001

(65) Prior Publication Data

US 2001/0049666 A1 Dec. 6, 2001

Related U.S. Application Data

(60) Provisional application No. 60/174,947, filed on Jan. 7, 2000.

(51) Int. Cl.
*G06F 21/00* (2006.01)
(52) U.S. Cl. ........... 705/50; 705/51; 705/52; 705/53; 705/54; 705/55; 705/56; 705/57; 705/58; 705/59
(58) Field of Classification Search ............ 705/50–59, 705/60; 713/200–204; 382/100
See application file for complete search history.

(56) References Cited

U.S. PATENT DOCUMENTS

| 5,629,980 | A | * | 5/1997 | Stefik et al. | 705/54 |
| 5,892,900 | A | * | 4/1999 | Ginter et al. | 713/200 |
| 6,041,411 | A | * | 3/2000 | Wyatt | 713/200 |
| 6,226,618 | B1 | * | 5/2001 | Downs et al. | 705/1 |
| 6,263,442 | B1 | * | 7/2001 | Mueller et al. | 713/201 |
| 6,760,463 | B2 | * | 7/2004 | Rhoads | 382/100 |
| 6,775,392 | B1 | * | 8/2004 | Rhoads | 382/100 |

* cited by examiner

*Primary Examiner* — Calvin Loyd Hewitt, II
*Assistant Examiner* — Cristina Owen Sherr
(74) *Attorney, Agent, or Firm* — Wood, Herron & Evans, LLP

(57) ABSTRACT

A document distribution system transfers a document from a source computer to a destination computer in the form of a print file. The print file defines the appearance of the document in a code suitable for telling a printer how to print the document. The source computer executes "license stamper" software for embedding an encoded license stamp into the print file before it is sent to the destination computer. Viewer software executed by the source computer receives and parses the print file to determine whether it contains the license stamp. If so, the viewer may generate a video display of the document defined by the print file or may print the document by sending the print file to a printer. However if the viewer receives a print file not containing the embedded license stamp, the viewer refrains from displaying or printing the document.

26 Claims, 2 Drawing Sheets

EMBEDDED LICENSE DATA FILE DISTRIBUTION AND PROCESSING SYSTEM

CROSS-REFERENCE TO RELATED APPLICATION

This application claims benefit of Provisional Application No. 60/174,947 filed Jan. 7, 2000. The entire disclosure of Provisional Application No. 60/174,947 is hereby incorporated by reference herein.

BACKGROUND OF THE INVENTION

1. Field of the Invention

The present invention relates in general to document distribution systems for transmitting a data file from one computer to another and in particular to a method for licensing the use of a document distribution system.

2. Description of Related Art

One important benefit of computer networks is that they allow a data file to be quickly transported from one location to another where it may be processed by software in the receiving computer. Computer networks commonly transport many kinds of data files, including for example, files defining documents to be printed or displayed by the receiving computer and files containing audio and video recordings that may be processed by the receiving computer to produce audio sounds or video displays.

A data file distribution system requires software in one or more source computers to send out the data file and software in one or more destination computers to receive and possibly process the data file. Software developers want to be compensated for the file distribution and processing software they develop. In many systems files are created by a relatively few commercial sources that are willing and able to pay license fees for the software they use to create the data files. However the data files are distributed to a relatively large number of non-commercial users that are less willing and able to pay licensing fees for the software they use to process the data files. Thus there has been many cases where software developers license software that creates and/or distributes data files for a fee but license software that receives and/or processes the data files free of charge. By creating a wide base of users that can process a particular type of file, the software developer creates a market for their file creation software.

Computer programs represent documents that may be printed or displayed using a large variety of file formats and although we can easily transmit a document file from one computer to another via a network or other means, we can't always be sure that the receiving computer will be capable of handling the document's particular file format. The popular "Acrobat" system for distributing documents requires a program in a sending computer to first convert a document file into a standardized "pdf" format. All computers receiving pdf files must use "viewer" software capable of processing pdf format files and displaying or printing the documents they describe. One reason the Acrobat system is widely used is that the system distributor provides viewers capable of reading the pdf format free of license charge to anyone who wants one. The system distributor charges only for the software needed to convert source document files into the pdf format. The existence of a large base of viewers encourages people who want to distribute documents to purchase and use the pdf conversion software.

One major drawback to the Acrobat system is that since the process converts a source document file to another (pdf) format, the document that is printed or displayed by the receiving computer from the pdf format file does not always exactly match the document that might have been printed or displayed by the software that created the original source file. This can happen, for example, when the Acrobat formatter may not have been updated to accommodate changes in the source file format employed by the software that created the source file. Also when there is no direct pdf format equivalent to a document feature defined in a source file the Acrobat formatter must either omit the feature from the document described by the pdf file or must approximate the feature with the nearest pdf equivalent. Also an Acrobat system will be unable to process a source file in an unknown format.

When a source program such as a word processor or graphic program prints a document it typically invokes the computer operating system's graphical description interface (GDI) which works with a printer driver to convert the document file to a "print file" that is then sent to a printer. The print file is a sequence of commands telling the printer how to print the document. One way to ensure that a receiving computer prints a document that closely matches a document that the source program would have printed is to simply send the print file generated by the source program to the receiving computer. The receiving computer can then forward the print file to its own printer. Any variation in the appearance of the document would be due only to variations between printers and would not arise from any inaccuracies in file format translation. A print file can also be used to transmit a document to be displayed on a screen instead of printer since some prior art viewers are capable of displaying a document on a video screen based on information contained in a print file.

Thus a system using standard print files for controlling printers as a medium for forwarding documents is likely to provide more accurate document reproduction than a system that translate source files into a standard document file format that does not directly control a printer. A print file-based system is also easier to maintain because such a system does not have to know how to translate a large number of document formats into a standard format. The printed output is the best representation of the document. Almost all source programs that create document files are capable of using an operating system's GDI and printer driver to convert document files into standard print files.

One reason that print file-based document distribution is not as widely used as the Acrobat system is that a would-be developer of such a system has little incentive to distribute free viewers capable of displaying and printing documents from print files. Unlike the Acrobat system, there is no opportunity for licensing file translation software because no translation program is needed; the source programs that create documents are themselves capable of generating the necessary print files. Although it is possible to charge a license fee for print file viewer software, a document distribution system that charges a viewer license fee may be less likely to be widely accepted than a document distribution system that only charges a license fee for software that distributes documents.

What is needed is licensing system by which a software distributor can provide software for receiving and processing data files of a standard format free of charge while obtaining a licensing fee from those who distribute those data files, even though the data files may be created by software that the distributor has no power to license.

SUMMARY OF THE INVENTION

The present invention relates to systems for distributing data files from a source computer to one or more other computers which then process the data file in some way. In particular the invention relates to a method for licensing those who use the system to distribute the data files even though the data files are of a format that can be produced by software over which the licensor has no power to license.

In accordance with one aspect of the invention, the user of the source computer licenses and executes "license stamper" software that embeds an encoded license stamp in a data file before it is forwarded to the destination computer. Software in the destination computer that processes the data file looks for the encoded license stamp in the data file and only processes the data file when the license stamp is present in the data file. Even the though data file may be of a standard format, the processing software will only process those data files that include the embedded license stamp supplied by the license stamper in the source computer.

In accordance with a particular embodiment of the invention the data file is a print file that tells a printer how to print a document, and the processing software is a viewer that processes the print file to produce a video display of the document.

In accordance with another aspect of the invention, the license stamp is embedded in a print file in such a way that it is ignored by a printer. Thus when the print file is sent to a printer, the license stamp does not affect the appearance of a document that is printed.

The concluding portion of this specification particularly points out and distinctly claims the subject matter of the present invention. However those skilled in the art will best understand both the organization and method of operation of the invention, together with further advantages and objects thereof, by reading the remaining portions of the specification in view of the accompanying drawing(s) wherein like reference characters refer to like elements.

BRIEF DESCRIPTION OF THE DRAWING(S)

DESCRIPTION OF THE PREFERRED EMBODIMENT(S)

Figure 1:
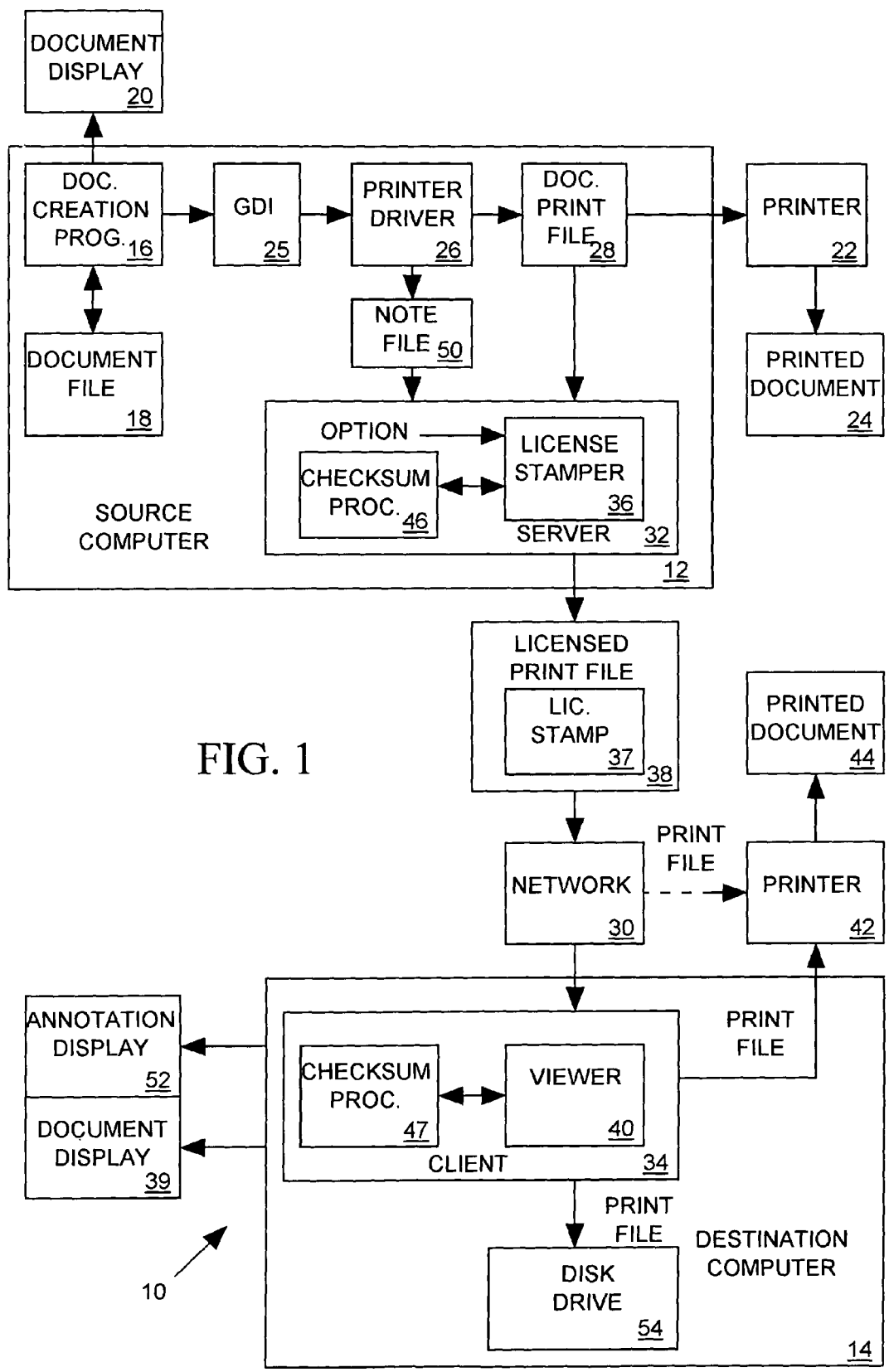
FIG. 1 illustrates in block diagram form a document distribution system in accordance with the present invention.

FIG. 1 illustrates in block diagram form a document distribution system 10 in accordance with the present invention for transferring a document from a source computer 12 to a destination computer 14.

Source computer 12 may include a conventional document creation program 16 such as, for example a word processing, graphics or spreadsheet program that creates and stores a document in the form of a document file 18 containing digital data describing the document in a format that is understood by the document creation program 16. The document creation program 16 typically creates a display 20 of the document described by the document file 18 on a video terminal. A user may request document creation program 16 to command a printer 22 to produce a printed version 24 of the document. In responding to that request, document creation program 16 invokes a graphical description interface (GDI) 25 provided by the source computer's operating system, GDI 25 then invokes a printer driver 26 that is associated with printer 22. Working together, document creation program 16, GDI 25 and printer driver 26 convert document file 18 into a print file 28 that is sent to printer 22. Print file 28 is a set of digitally-encoded commands that tell printer 22 how to print the printed document 24.

A user may alternatively command the source computer's operating system to route print file 28 to a file server 32 running on the source computer. In accordance with the invention, file server 32 includes a license stamper 36 which embeds a "license stamp" 37 in print file 28 to produce a "licensed" print file 38. License stamp 37 consists of code that is distinguishable from the rest of the data in print file 28. Server 32 stores the licensed print file 38 and may later forward a copy of the licensed print file via a network link 30 to a requesting client 34, such as browser software running on destination computer 14. In accordance with the invention, client 34 is adapted to include a viewer 40 that looks for the license stamp in any print file client 34 received via network 30. If viewer 40 does not find the license stamp in the incoming print file, it refrains from further processing the print file. However when viewer 40 finds a valid license stamp in an incoming print file 38 it converts the print file into a file format suitable for enabling client 34 to generate a display 39 of the document defined by the print file on a video screen. Viewer 40 may also respond to a user request by permitting sending the licensed print file 38 to a printer 42 accessed by destination computer 14 so that printer 42 can print a printed version 44 of the document, or by storing print file 38 in a local disk drive 54. Thus the output of client 34 (a document display 39, a print file sent to printer 42 or disk drive 54) produced in response to an incoming print file 38 can occur only when viewer 40 finds a license stamp 37 in the incoming print file.

Suppose a software manufacturer supplies viewers free of charge to large numbers of destination computers that can generate displays of documents described by print files but licenses servers running on source computers for distributing print files to the destination computers. The software manufacturer would like to prevent the viewers in the destination computers from producing displays based on print files that were not sent by licensed servers. The software manufacturer can do this by including a license stamper 36 in each licensed server 32 and adapting the viewers 40 to display or print incoming print files only when they include a valid license stamp 37.

To help prevent others from copying a license stamp 37 and inserting it into a print file not forwarded by a licensed server, license stamper 36 includes a checksum value within the license stamp 37. A "checksum" is a file attribute having a value that is influenced by every byte of the file. For example a typical print file 28 is formed by a sequence of 8-bit data bytes. We could produce a simple checksum by adding all the binary values of all the bytes forming print file 28 and using the 8 least significant bits of the resulting sum as a checksum value. Since a change in the print file is highly likely to produce a change in the checksum value, we can usually determine whether a file has been changed by determining whether its checksum has changed.

Before license stamper 36 embeds the license stamp in a print file 28 it passes the print file to a checksum processor 46 which returns a checksum value for print file 28 license stamper 36. License stamper 36 then encodes the checksum and incorporates it into license stamp 37. Thereafter, when viewer 40 receives a print file via network 30 and finds license stamp 37, it sends the print file 38 (sans license stamp 37) to a checksum processor 47 also included within client 34. Checksum processor 47 then re-computes the print file's checksum and returns it to viewer 40. Viewer 40 then compares the checksum value produced by checksum processor 47 to the checksum value included in the license stamp 37.

Any difference in the checksum values may indicate either that print file 38 has been corrupted, or that the license stamp 37 was not originally generated for that particular print file. Hence if the checksum output of checksum processor 47 does not match the checksum included in license stamp 37, viewer 40 refrains from generating a document display 39 and produces an error message.

The license stamp 37 embedded in print file 38 may include any suitable code that identifies the print file as having been processed by a "licensed" license stamper 36. In addition to an encoded checksum, license stamp 37 may also include additional information such as, for example, a unique license number assigned to stamper 36 identifies the licensee, the date the file was stamped, and a user ID of the person using server 32. In the preferred embodiment of the invention, a user of source computer 12 may provide licenser stamper 36 with a note print file describing an annotation relative to the document described by the document print file 28. In such case license stamper 36 incorporates the note print file into the license stamp 37. When viewer 40 receives a print file 38 containing a license stamp incorporating a note print file, it generates an annotation display 50 when it produces the document display 39, for example, in the well-known "sticky note" form superimposed on document display 39.

License stamper 36 also includes OPTION codes in license stamp 37 telling viewer 40 how to respond to the incoming print file 38. One OPTION code indicates whether viewer 40 should request a security code from the destination computer operator and another OPTION code indicates the correct security code. If the security code option is requested, viewer 40 refrains from displaying or printing the document until the operator supplies the correct security code. Other OPTION codes can inhibit viewer 40 from displaying the document, from sending the print file to a printer, or from storing the print file in local disk drive 54.

Thus the license stamp 37 embedded into print file 38 suitably has the following fields:
   Source Computer ID
   Licensee
   User ID
   Date
   Checksum
   OPTION CODES:
     Security code
     Displayable
     Printable
     Savable
     Note Length
   Note File The Source Computer ID field identifies the source computer 12. The Checksum field contains the checksum produced by checksum processor 46. The Licensee and User ID fields identify the server licensee and the person using the server. The field indicates the date the file was stamped. The Note file filed contains the note file, if any included in the license stamp. Option code fields include a security code field containing an encrypted version of the security code, if any, viewer 40 must receive from the destination computer operator before it will display, print or save the print file. Single-bit Displayable, Printable, and Savable fields enable the viewer 40 to display, print or locally save the print file. The Note Length field indicates the length of the Note File field.

Regardless of the nature of information it may convey, license stamp 37 is suitably embedded into the license print file 38 in a manner that does not affect how printer 42 prints the document. Some printers are directly connected to a network and are adapted to directly receive print files via a network link 30. Since printer 42 can't remove the license stamp 37 from print file 38, license stamp 37 should be embedded in a way that it will have no influence the printed document 44. There are relatively few print file formats in wide use and each such format permits inclusion of codes that will be ignored by a printer. One of the most common print file formats is the Hewlett Packard print control language (PCL) which is primarily a list of printer commands that the printer executes sequentially. A PCL print file can include one or more "macros", sets of printer commands that are out of the main command sequence which can be repeatedly called and executed by other PCL code in the main command sequence. In accordance with the invention, license stamper 36 embeds license stamp 37 in the form of a macro that is added to print file 28 to produce licensed print file 38. However since the macro containing the license stamp 37 is never called by other PCL code in print file 28, that macro will have no effect on the manner in which printer 42 prints document 44.

Another common print file format is the Hewlett Packard Graphic Language (HPGL) that was originally developed to control plotters, but which is also understood by many printers. This language encodes commands as a sequence of two-character commands such as "PU" (pen up) and "PD" (pen down). A printer (or plotter) that encounters a sequence of characters in an HPGL print file that are not standard commands simply ignores that sequence of characters. License stamper 36 encodes license stamp 37 into HPGL print files as a sequence of characters that do not match any standard HPGL command.

Some print file formats act as algorithmic programs, including a main sequence and various subroutines and functions calls, for telling a printer how to print a document. For such print file formats license stamper 36 can simply embed license stamp 37 after the end of the main sequence or at the end of the file, since in either case the program ends before it reaches the license stamp.

Since the print file 38 sent to printer 42 by destination computer 14 and the print file 28 sent to printer 22 by source computer 12 are identical, except for the embedded license stamp 37 that printer 42 ignores, the two printed documents 24 and 44 will be substantially identical. Any difference between the two documents will be due solely to differences, if any, between printers 22 and 42. The document display 39 that client 34 generates can also closely match the printed document 44 because it is based on the same print file 38 used to produce printed document 44.

While source computer 12 of FIG. 1 includes the document creation program for creating the print file to be distributed, source computer 12 need not include document creation program 16 but may instead receive print files from other computers to be forwarded by server 32. Also server 32 and client 34 may be any of many types of well-known client server systems. For example server 32 may be a web server, client 34 may be a web browser, and print file 28 may embody a document or a portion of a document that is to be viewed through the web browser. Server 32 and client 34 may also be, for example, an internet file transfer protocol server and client or a bulletin board server and client.

Figure 2:
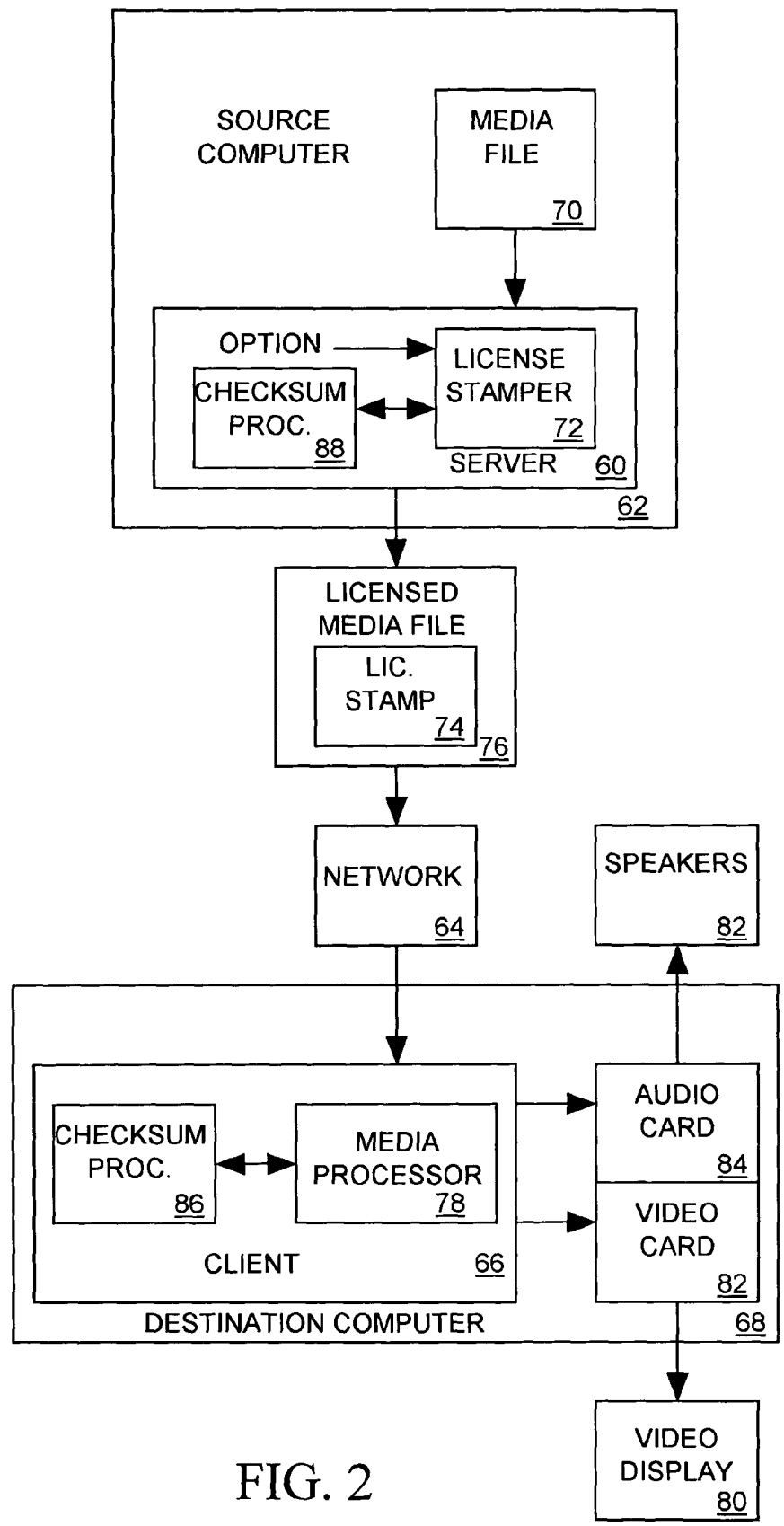
FIG. 2 illustrates in block diagram form a multi-media file distribution system in accordance with the present invention.

While in the preferred embodiment of the invention as described herein the licensing system is employed in a system that distributes print file, the licensing system is also useful in other data file distribution systems. For example as illustrate in FIG. 2, server software 60 running on a source computer 62 employs a network link 64 to transmit a media file to a requesting client software 66 running in a destination computer 68. The media file 70 may be of a media standard format such as, for example, the well-known MPEG, JPEG, or MP3 formats. In accordance with the invention, server 60 includes a license stamper 72 for embedding a license stamp 74 in the media file to produce a licensed media file 76 that is forwarded to the destination computer 68. Client software 66 includes a media processor 78 that converts the media file 76 into a video display 80 and/or audio output on speakers 82 via a video card 82 and audio card 84. However media processor 78 refrains from producing the video and/or audio output when the license stamp 74 has not been embedded into the incoming media file 76 or if a media file checksum generated by a checksum processor 88 in server 60 and included in license stamp 74 does not match a checksum produced by a checksum processor 86 within client 66. As discussed above in connection with the print file distribution system of FIG. 1, license stamp 74 may include various option codes for enabling or inhibiting various processing options of media processor 78 such as, for example, the option to permit saving of the media file in a local disk drive. Thus for example a distributor of media files may distribute media processors 78 free to those who buy the MP3 files, but the players will play only those files that contain the license stamps.

In an implementation where it is desirable to prevent media file 76 from being used by other media processors (for example stand-alone MP3 players) the license stamp may be embedded in the media file 76 in such a way that it does substantially interfere with the operation of such other media players. Also server 60 may be adapted to encode media file 76 so that it is a non-standard format that can only be processed by media processor 78.

Thus while the forgoing specification has described preferred embodiment(s) of the present invention, one skilled in the art may make many modifications to the preferred embodiment(s) without departing from the invention in its broader aspects. The appended claims therefore are intended to cover all such modifications as fall within the true scope and spirit of the invention.

The invention claimed is:

1. For a data file distribution and processing system including server software running on a source computer for sending data files to a destination computer via a network link between the source computer and the destination computer, and including processing software running on the destination computer for processing each data file forwarded thereto from said server software to carry out an action, a method for preventing the processing software running on the destination computer from processing data files forwarded to the destination computer other than from the server software, the method comprising the steps of:
    including within the server software running on the source computer license stamping means for embedding a license stamp into each data file before the server software forwards the data file to said destination computer via said network link; and
    adapting said processing software executed by said destination computer so that it processes each received data file to carry out said action only when the received data file contains the embedded license stamp, wherein the license stamp embedded in the data file indicates that the data file was forwarded by licensed server software.

2. The method in accordance with claim 1 wherein said encoded license stamp comprises a code identifying said source computer.

3. The method in accordance with claim 1 wherein said each data file, including its embedded license stamp, is a print file defining a document in a format suitable for directly causing a printer to print said document.

4. The method in accordance with claim 3 wherein said license stamping means embeds said encoded license stamp into each data file in such a way that said printer.

5. The method in accordance with claim 3 wherein said action carried out by said processing software comprises displaying on a computer monitor a representation of the document defined by the data file.

6. The method in accordance with claim 3 wherein said action carried out by said processing software comprises causing said printer to print said document.

7. The method in accordance with claim 1 wherein said data file defines a sound and wherein said action carried out by said processing software comprises a initiating said sound.

8. The method in accordance with claim 1 wherein said data file defines a video image and wherein the action carried out by said processing software comprises initiating a display of said video image.

9. The method in accordance with claim 1 wherein said license stamping means also processes said data file to determine a value of an attribute of the data file and includes in said embedded license stamp an attribute code indicating said value of said attribute, and wherein the method further comprises the step of
    adapting the processing software to process the data file to determine a value of said attribute of the data file, and to refrain from processing the data file to carry out said action unless the received data file includes an embedded license stamp containing said attribute code indicating a value of said attribute matching the value of said attribute determined by said processing software.

10. The method in accordance with claim 9 wherein the data file processed by said license stamping means consists of a plurality of data bytes, each of which influences the value of said attribute determined by said license stamping means.

11. The method in accordance with claim 1
    wherein said license stamping means includes a processing option code within said license stamp embedded within said data file, and
    wherein the option code influences the nature of the output the processing software produces when processing the data file.

12. A data file distribution and processing system comprising:
    a source computer;
    a destination computer; and
    network means for conveying data files from said source computer to said destination computer,
    wherein said source computer executes server software for sending data files to the destination computer via said network means,
    wherein said destination computer executes processing software for processing each data file forwarded thereto from said server software to carry out an action,
    wherein said server software includes license stamping means for embedding a license stamp into each data file before the server software forwards the data file to said destination computer via said network means,
    wherein said processing software processes each received data file to carry out said action only when the received data file contains the embedded license stamp, and
    wherein the license stamp embedded in the data file indicates that the data file was forwarded by licensed server software.

13. The data file distribution and processing system in accordance with claim 12 wherein said encoded license stamp comprises a code identifying said source computer.

14. The data file distribution and processing system in accordance with claim 12 wherein each said data file, including its embedded license stamp, is a print file defining a document in a format suitable for directly causing a printer to print said document.

15. The data file distribution and processing system in accordance with claim 14 wherein said license stamping means embeds said encoded license stamp into the data file in such a way that said printer ignores the encoded license stamp when printing said document in response to said data file.

16. The data file distribution and processing system method in accordance with claim 14 wherein said action carried out by said processing software comprises displaying on a computer monitor a representation of the document defined by the data file.

17. The data file distribution and processing system in accordance with claim 16 wherein said action carried out by said processing software comprises causing said printer to print said document.

18. The data file distribution and processing system in accordance with claim 12 wherein said data file defines a sound and wherein said action carried out by said processing software comprises a initiating said sound.

19. The data file distribution and processing system in accordance with claim 12 wherein said data file defines a video image and wherein the action carried out by said processing software comprises initiating a display of said video image.

20. The data file distribution and processing system in accordance with claim 12
   wherein said license stamping means also processes each said data file to determine a value of an attribute of the data file and includes in said embedded license stamp an attribute code indicating said value of said attribute, and
   wherein the processing software processes each received data file to determine a value of said attribute of each data filed received, and refrains from processing the received data file to carry out said action unless the received data file includes an embedded license stamp containing said attribute code indicating a value of said attribute matching the value of said attribute determined by said processing software.

21. The data file distribution and processing system in accordance with claim 20 wherein the data file processed by said license stamping means consists of a plurality of data bytes, each of which influences the value of said attribute determined by said license stamping means.

22. The data file distribution and processing system in accordance with claim 12
   wherein said license stamping means includes a processing option code within said license stamp embedded within said data file, and
   wherein the option code influences the nature of the output the processing software produces when processing the data file.

23. A data file distribution and processing system comprising:
   first means for providing a data file;
   second means for receiving the data file, for checking the data file to determine whether the data file contains an encoded license, and for thereafter processing the data file only when the data file contains the encoded license; and
   third means for receiving the data file provided by said first means, for embedding said encoded license in the data file, and for forwarding said data file with the encoded license embedded therein to said second means, such that said encoded license indicates said data file as having been forwarded by said third means.

24. The data file distribution and processing system in accordance with claim 23 further comprising a printer,
   wherein said data file provided by said first means is a print file suitable as input to said printer for instructing said printer to print a document, and
   wherein said third means processes said data file by displaying an image of said document and by transmitting said data file as input to said printer such that said printer prints said document in response to said print file.

25. The data file distribution and processing system in accordance with claim 23 wherein said second means embeds said encoded license into the data file in such a way that the printer ignores the encoded license when printing said document.

26. The data file distribution and processing system in accordance with claim 23 wherein said embedded license includes a code identifying a licensee.

* * * * *